United States Patent
Li et al.

(10) Patent No.: US 11,032,202 B2
(45) Date of Patent: *Jun. 8, 2021

(54) LOAD BALANCING IN DATA HOSTING SYSTEMS

(71) Applicant: INTERNATIONAL BUSINESS MACHINES CORPORATION, Armonk, NY (US)

(72) Inventors: Ping Li, Shanghai (CN); Liang Rong, Suzhou (CN); Gang Tang, Nanjing (CN); Ming Shuang Xian, Wuxi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/592,832

(22) Filed: Oct. 4, 2019

(65) Prior Publication Data
US 2020/0036638 A1   Jan. 30, 2020

Related U.S. Application Data

(63) Continuation of application No. 15/829,652, filed on Dec. 1, 2017, now Pat. No. 10,541,924.

(51) Int. Cl.
*H04L 12/803* (2013.01)
*H04L 29/12* (2006.01)
*H04L 12/741* (2013.01)

(52) U.S. Cl.
CPC .......... *H04L 47/125* (2013.01); *H04L 45/745* (2013.01); *H04L 61/25* (2013.01); *H04L 61/255* (2013.01); *H04L 61/2514* (2013.01)

(58) Field of Classification Search
CPC ..... H04L 47/125; H04L 45/00; H04L 45/745; H04L 29/12339; H04L 29/12349;
(Continued)

(56) References Cited

U.S. PATENT DOCUMENTS 9,596,493 B2   3/2017   Nix
2013/0301650 A1   11/2013   Zou
(Continued)

FOREIGN PATENT DOCUMENTS

CN   105490910 A1   4/2016
WO   2016192866 A1   12/2016

OTHER PUBLICATIONS

IBM, List of IBM Patents or Patent Applications Treated as Related, Appendix P, dated Oct. 10, 2019, 2 pages.
(Continued)

*Primary Examiner* — Peter Chen
(74) *Attorney, Agent, or Firm* — Richard A. Wilhelm (57) ABSTRACT

A method for load balancing network traffic. First network address translation rules are executed with respect to a first data packet of the network traffic to translate initial address space data thereof, with respect to an initial destination network address and port identifier. An entry is generated with respect to the first data packet that includes data related to the translated destination network address and port identifier, and an initial source network address and port identifier. A second data packet is received from a client. The generated entry is identified and implemented in executing second network address translation rules with respect to the second data packet, to translate address space data thereof with respect to an initial destination network address and port identifier, for routing thereof to the host, and upon servicing, for routing thereof directly to the client.

6 Claims, 5 Drawing Sheets

(58) Field of Classification Search
CPC ......... H04L 29/12358; H04L 29/12367; H04L 29/12377; H04L 29/12481; H04L 63/0272; H04L 63/0263; H04L 61/25; H04L 61/2557; H04L 61/2503; H04L 61/251; H04L 61/2514; H04L 61/2517; H04L 61/2575; H04L 61/2567; H04L 61/2507

See application file for complete search history.

(56) References Cited

U.S. PATENT DOCUMENTS

| | | |
|---|---|---|
| 2014/0095686 A1 | 4/2014 | Zhou |
| 2017/0012941 A1 | 1/2017 | Subbarayan |
| 2017/0324847 A1 | 11/2017 | Good |
| 2019/0173796 A1 | 6/2019 | Li et al. |

OTHER PUBLICATIONS

Mell et al., "The NIST Definition of Cloud Computing", NIST, Sep. 2011, 7 Pages, Special Publication 800-145, U.S. Department of Commerce, Gaithersburg, MD.

Redhat, "2.4 Routing Methods: 2.4.1 NAT Routing: Figure 2.3 Load Balancer Implemented with NAT Routing", Printed on Oct. 26, 2017, 6 Pages, https://access.redhat.com/documentation/en-us/red_hat_enterprise_linux/7/html/load_balancer administration/s1-lvs-routing-vsa#s2-lvs-nat-VSA.

Wikipedia, "Virtualization", Printed on Oct. 26, 2017, 7 Pages, https:en.wikipedia.org/wiki/Virtualization.

LOAD BALANCING IN DATA HOSTING SYSTEMS

BACKGROUND

The present invention relates generally to load balancing in a computer network, and in particular to load balancing in a data hosting system.

SUMMARY

According to an aspect of the present invention, a method is provided for load balancing network traffic in a data hosting network. The method includes executing first network address translation rules with respect to a first data packet of the network traffic, to translate initial address space data of the first data packet with respect to an initial destination network address and port identifier of the first data packet, for routing of the data packet to a host of the data hosting network. An entry is generated based on the initial and translated address space data of the first data packet, as well as on an initial source network address and port identifier of the first data packet. A second data packet of the network traffic is received from a client. The generated entry is identified based on correspondence between the initial address space data of the first data packet and initial address space data of the second data packet. Second network address translation rules are executed with respect to the second data packet according to the identified entry to translate the initial address space data of the second data packet. The second rules are executed based on the translated destination network address and port identifier of the first data packet, to translate data related to an initial destination network address and port identifier of the second data packet, for routing of the second data packet to the host. The second data packet is then routed with respect to the initial and translated address space data of the second data packet, wherein the second data packet is routed directly to the client upon servicing of the second data packet based on data related to an initial source network address and port identifier of the second data packet.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Internet hosting services implement Internet or web hosting systems such as clustered hosting systems, cloud hosting systems, and the like, to host and provide electronic or virtual resources or services for end-use. The electronic resources may include, for example, virtual resources such as virtual computing platforms, virtual operating systems, virtual applications or workspaces, virtual data storage, or virtual instances thereof. The electronic services may include, for example, virtual services such as web services, email services, or the like. The electronic resources or services may otherwise include, for example, implemented containerization or operating system level virtualization, application virtualization, workspace virtualization, service virtualization, or the like.

A data hosting computer network system such as a web hosting system, an Internet hosting system, or the like, may include, for example, a computer network having computing resources including computing clusters formed by interconnected node elements such as computing platforms, virtual hosts, or the like. The data hosting system may implement load balancing by way of a cluster management system such as a container cluster management system to control and apply the node elements in hosting and providing electronic resources or services, such as by way of hosted containers, and the like, to service or otherwise respond to corresponding requests for the electronic resources or services, accordingly. For example, the cluster management system may allocate and provision clusters of one or more node elements to respectively host corresponding groups of one or more containers, partitions, virtualization engines, or the like, to respectively host and route the electronic resources or services or instances thereof for end-use, accordingly. A group of containers may be, for example, specified or otherwise created by the cluster management system in association with a corresponding electronic resource or service hosted and provided by the data hosting system, with respect to node elements by which each container in the group may be hosted, accordingly. A routable IP address corresponding to the electronic resource or service may be bound to the group of containers for use in controlling network traffic in the data hosting computer network system. A request for the electronic resource or service may be routed for servicing with respect to, for example, individual clusters of node elements, individual groups of containers, or individual containers or node elements, accordingly.

The load balancing implemented in the data hosting computer network system may utilize network address translation (NAT), or "NAT routing" as known in the art.

Embodiments of the present invention are directed to a system and method for load balancing in a data hosting computer network system. The method utilizes asymmetric destination network address translation (DNAT) to implement distributed load balancing in the data hosting computer network system.

Advantageously, the method may be implemented, such as by node or routing elements or virtual containers of the data hosting computer network, to provide distributed load balancing in the data hosting network with respect to received network traffic. The method enables increased data and network bandwidth, decreased response time, reduced network traffic congestion, and improved data handling of and by the data hosting network, by enabling serviced or otherwise processed network traffic to be routed and sent directly to clients by the node elements involved in initially routing the received network traffic corresponding to the serviced network traffic. That is to say that the method eliminates network traffic congestion and "bottle necks" in the data hosting system by eliminating the need for designated node elements used to send the processed network traffic to the clients, as in data hosting systems known in the art. In other words, the method limits the network traffic handled by any one container by enabling the hosted containers to route processed network traffic to clients directly, eliminating bottle necks in network traffic produced by routing processed network traffic to designated containers for such tasks. The method may find particular application in load balancing with respect to high bandwidth activities such as electronic media streaming, and the like. The method also preserves routing path data of the routed network traffic with respect to conventional network address translation routing methods, which may be helpful in tasks relating to auditing, logging, and authentication.

To that end, embodiments of the present invention provide improvements to network trafficking technologies and methods, with respect to the operation and performance of data hosting computer networks.

Figure 1:
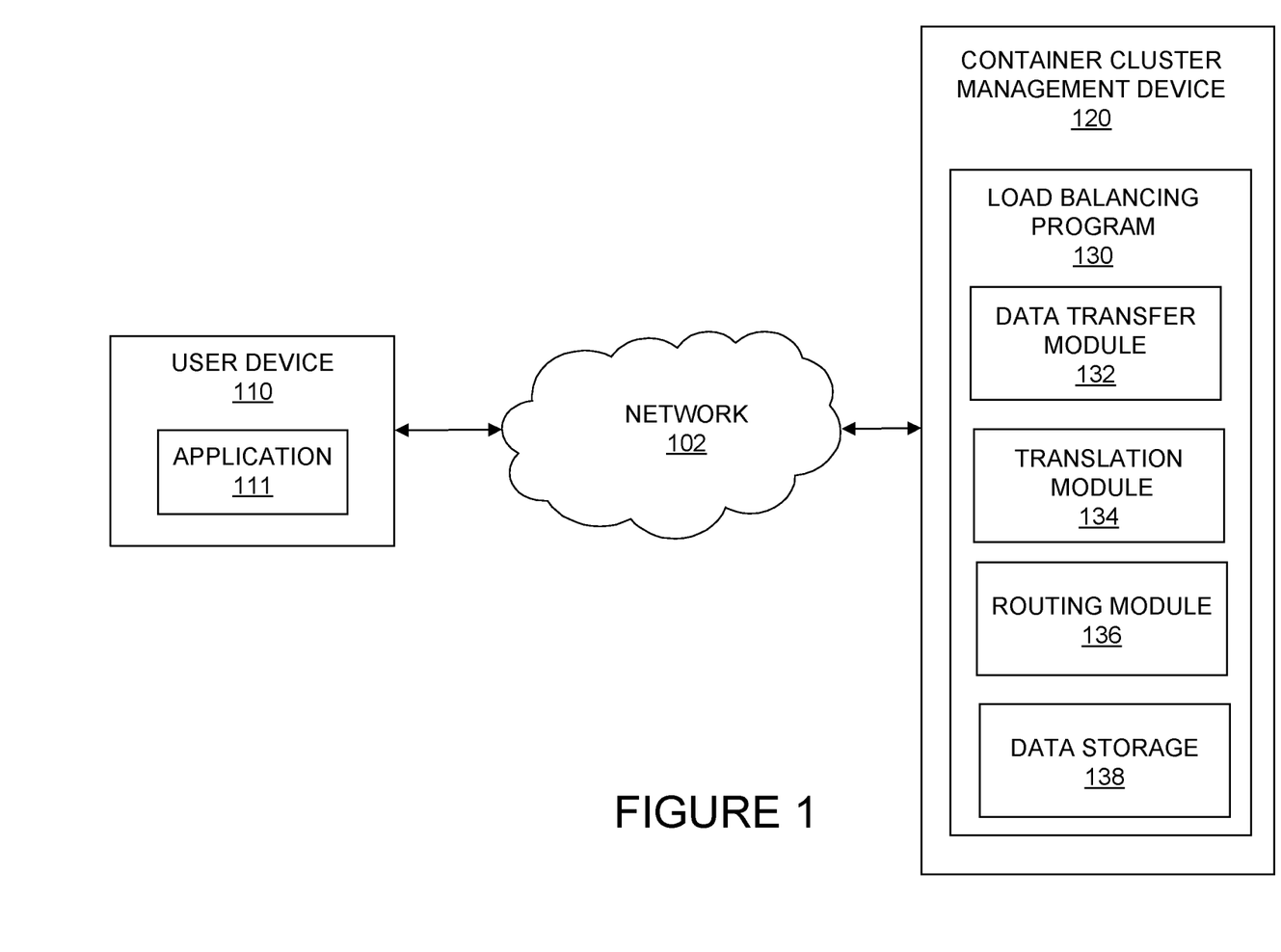
FIG. 1 is a functional block diagram depicting a load balancing system, in accordance with an embodiment of the present invention.

FIG. 1 is a functional block diagram depicting load balancing system 100, in accordance with an embodiment of the present invention. Load balancing 100 may include user device 110 and container cluster management device 120 interconnected by way of network 102, accordingly. While FIG. 1 depicts two discrete devices in load balancing system 100, other arrangements may be contemplated, for example, user device 110 and container cluster management device 120 may be one or more integrated devices.

In various embodiments of the present invention, network 102 represents, for example, an intranet, a local area network (LAN), a personal area network (PAN), a wireless local area network (WLAN), a wireless personal area network (WPAN), or a wide area network (WAN) such as the Internet, and may include wired, wireless, or fiber optic connections. In general, network 102 may be any combination of connections and protocols that may support communications between user device 110 and container cluster management device 120, in accordance with embodiments of the present invention. In the various embodiments, network 102 may be, for example, the Internet, representative of a worldwide collection of networks and gateways that may support communications between devices connected to the Internet.

In various embodiments of the present invention, user device 110 and container cluster management device 120 each respectively represent individual or integrated computing platforms such as a wearable or implantable computer or device, a smart phone, a tablet computer, a laptop computer, a desktop computer, or a computer server. In the various embodiments, user device 110 or container cluster management device 120 may otherwise be any other type of computing platform, computing system, or information system capable of sending and receiving data to and from another device by way of network 102. User device 110 or container cluster management device 120 may include internal and external hardware components, as described with reference to FIG. 3. In other embodiments, user device 110 and/or container cluster management device 120 may be implemented in a cloud computing environment, as described with reference to FIGS. 4 and 5.

In an embodiment of the present invention, user device 110 may be, for example, a computing platform such as a client computing platform that hosts an application or program such as application 111. User device 110 may implement a combination of devices and technologies, such as network devices and corresponding device drivers, to support the operation of application 111, and to provide a platform enabling communications between user device 110 and container cluster management device 120 by way of network 102, accordingly.

Application 111 may be a program such as a software program, one or more subroutines contained in a program, an application programming interface, or the like. Application 111 may be used to request electronic resources or services such as the electronic resources or services hosted and provided by the data hosting computer network system. In an embodiment of the present invention, application 111 may be used to request, for example, an electronic resource or service for end-use.

In an embodiment of the present invention, container cluster management device 120 may be, for example, a computing platform such as a server computing platform that hosts an application such as load balancing program 130. Container cluster management device 120 may implement a combination of devices and technologies, such as network devices and corresponding device drivers, to support the operation of load balancing program 130, and to provide a platform enabling communications between user device 110 and container cluster management device 120 by way of network 102, accordingly.

Load balancing program 130 may be a program such as a software program, one or more subroutines contained in a program, an application programming interface, or the like. Load balancing program 130 may include data transceiver module 132, translation module 134, routing module 136, and data storage 138. In an embodiment of the present invention, load balancing program 130 may implement, for example, network address translation routing such as asymmetric destination network address translation routing to implement load balancing in the data hosting computer network system, accordingly.

Data transceiver module 132 communicates with the data hosting computer network system to monitor received data including data packets in the data hosting system. The data may be received, for example, by way of a network such as network 102 from clients such as application 111 residing on user device 110. The received data may otherwise include, for example, network packets, datagrams, or the like. Data transceiver module 132 further communicates by way of a network such as a private network with node elements such as the node elements of the data hosting system to send network address translation rules for application by the node elements to collectively implement load balancing in the data hosting system with respect to data packets such as the received data packets. Data transceiver module 132 further communicates by way of the private network with the node elements to monitor the containers and groups of containers hosted by the node elements. Data transceiver module 132 may store received data in data storage 138, such as in the form of separate computer-readable data files, or the like, for later retrieval and use.

In an embodiment of the present invention, a data packet such as one received by data transceiver module 132 may include, for example, a header or data packet header including address space data of the data packet. The address space data may include, for example, network interface data relating to network addresses and corresponding port identifiers of respective senders and receivers of the data packet. In the embodiment, the address space data of the data packet may include, for example, a source network address and port identifier of a sending host, and a destination network address and port identifier of a receiving host. In the embodiment, the source and destination network addresses may be, for example, source and destination IP network addresses, respectively. In the embodiment, the destination network address may be or otherwise include, for example, a routable address such as a routable IP address, or the like. In the embodiment, the data packet may further include, for example, a payload including data relating to the request for the electronic resource or service.

Translation module 134 generates network address translation rules for implementation of the load balancing in the data hosting computer network system, accordingly. In an embodiment of the present invention, the network address translation rules may include, for example, asymmetric destination network address translation rules. In the embodiment, the generated network address translation rules may be installed or otherwise stored on a node element of the data hosting system for application by the node element with respect to network traffic including data packets, such as the received data packet, accordingly. In the embodiment, the generated network address translation rules may be implemented to, for example, translate, map, transform, or otherwise modify address space data of the data packet to enable routing and load balancing of the data packet with respect to networks such as network 102 and the private network of the data hosting system, accordingly.

Routing module 136 allocates and provisions a cluster of one or more node elements of the data hosting computer network system to host a group of one or more containers, for use in routing and load balancing network traffic in the data hosting system between networks such as network 102 and the private network, accordingly. The allocated and provisioned clusters of node elements may otherwise host groups of one or more partitions, virtualization engines, or the like. Routing module 136 further binds or otherwise assigns routable addresses such as routable IP addresses to each hosted group of containers, respectively, for controlling the routing and the load balancing of the network traffic between the networks with respect to the hosted groups of containers, accordingly. Routing module 136 further implements the load balancing in the data hosting system, in accordance with embodiments of the present invention.

In an embodiment of the present invention, a group of containers may be, for example, hosted by an allocated and provisioned cluster of node elements of the data hosting computer network system. In the embodiment, the group of containers may be, for example, assigned a routable IP address with respect to the node elements of the allocated and provisioned cluster by which each container in the group of containers may be hosted, accordingly. In the embodiment, the network traffic including the data packets, such as the received data packet, may be routed with respect to the hosted group of containers for servicing or processing based on the routable IP address assigned to the hosted group of containers, accordingly.

In an embodiment of the present invention, the data hosting computer network system may include, for example, a frontend network and a backend network to which each node element, such as of the allocated and provisioned cluster, may be respectively interconnected for communication. In the embodiment, the frontend network may include, for example, frontend server computing platforms and network gateways interconnected for communication with network 102, to receive the network traffic for subsequent routing and handling with respect to a container of the hosted group of containers. In the embodiment, the backend network may include, for example, backend database computing platforms and network gateways, including backend node elements such as of the allocated and provisioned cluster. The container of the hosted group of containers may be hosted by a corresponding backend node element. In the embodiment, each node element may be, for example, interconnected for communication with the private network to enable receipt of the network traffic, accordingly.

Figure 2:
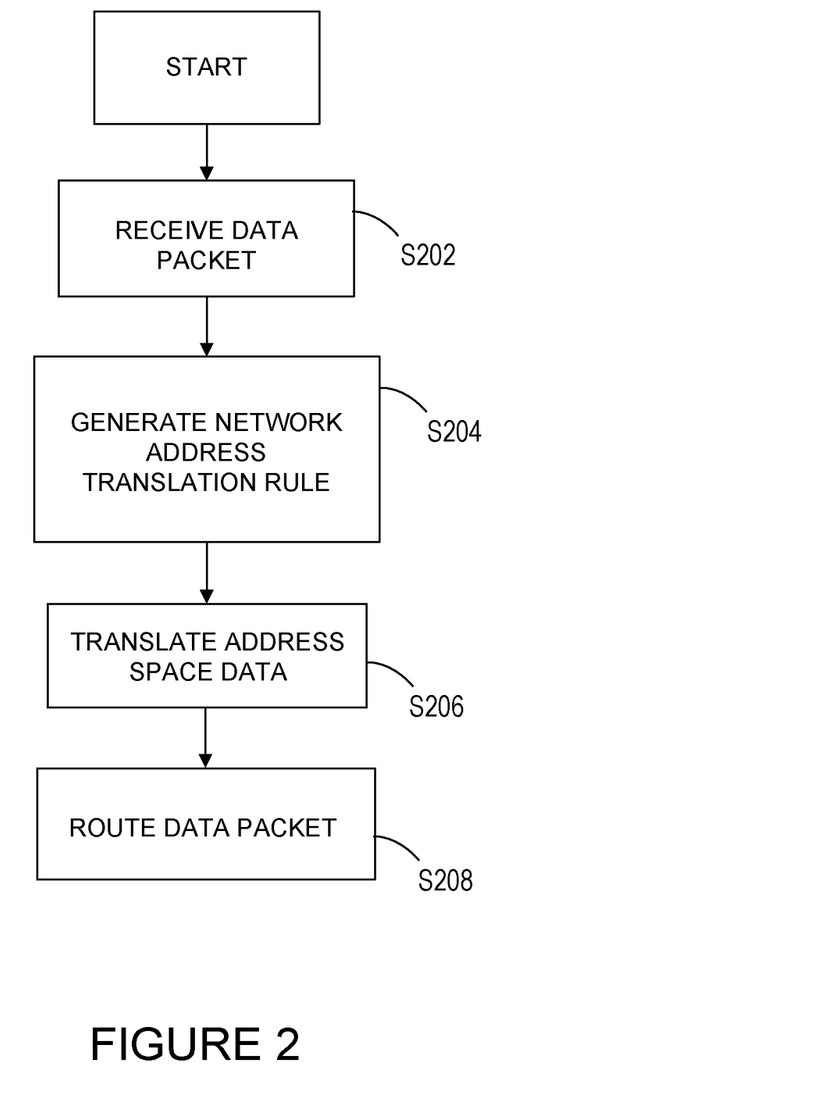
FIG. 2 is a flowchart depicting operational steps of an aspect of the load balancing system, in accordance with an embodiment of the present invention.

FIG. 2 is a flowchart depicting operational steps of an aspect of load balancing system 100, in accordance with an embodiment of the present invention.

At step S202, data transceiver module 132 communicates with the data hosting computer network system to monitor the received data including data packets in the data hosting computer network system. In an embodiment of the present invention, data transceiver module 132 may communicate with the data hosting system by way of the private network.

At step S204, translation module 134 generates the network address translation rules, including the asymmetric destination network address translation rules, for implementation of the load balancing in the data hosting computer network system. In an embodiment of the present invention, the network address translation rules may be generated to enable the handling of the network traffic by way of a container of the hosted group of containers. In the embodiment, the network address translation rules may be generated to enable implementation thereof in routing of the network traffic with respect to an appropriate container, such as hosted by a corresponding backend node element, for processing and further handling by way of the appropriate container, accordingly. In the embodiment, the generated network address translation rules may further be generated to enable implementation, such as by way of the backend node element, in handling processed data packets, and further, to enable routing of the processed data packets by way of the appropriate container directly to a client such as application 111.

In an embodiment of the present invention, the network address translation rules may be generated with respect to, for example, a hosted group of containers, each container of the hosted group of containers, and a routable address and corresponding port identifier assigned to the hosted group of containers. In the embodiment, the network address translation rules may be generated for, and upon creation of, each respectively created group of containers to which a routable address is respectively assigned. In the embodiment, the network address translation rules may be updated with respect to the hosted group of containers, such as by addition of a new rule or subtraction of an existing rule, based on each container added to or removed from the group of containers. For example, a network address translation rule may be generated for each new container added to the group of containers, and a network address translation rule may be deleted for each container deleted or otherwise removed from the group of containers, with respect to network address translation rules corresponding to the group of containers. In the embodiment, data transceiver module 132 may monitor the group of containers, which may generate monitoring data relating to individual containers of the group of containers, such as with respect to addition or subtraction of one or more of the individual containers from the group, accordingly. The groups of containers may be created, for example, by an end-user or automatically, such as by way of a container cluster management system, or the like. Generally, a manner of creating the groups of containers may be chosen as a matter of design.

In an embodiment of the present invention, the network address translation rules may be generated for addition to a destination translation table with respect to the hosted group of containers, each container of the hosted group of containers, and the routable address and corresponding port identifier assigned to the group of containers. In the embodiment, the network address translation rules may further be generated with respect to one or more backend containers and corresponding network addresses and port identifiers of the backend containers, to which network traffic may be routed from each of the containers of the group of containers, respectively. In the embodiment, the backend containers may be hosted by one or more corresponding backend node elements in the backend network. In the embodiment, the destination translation table may include, for example, an entry for each generated network address translation rule, accordingly.

In an embodiment of the present invention, an entry in the destination translation table may include, for example, a network address translation function such as a destination network address translation function, for application in translating, mapping, or transforming address space data of a data packet, such as may be received as part of the network traffic received by the frontend network by way of network 102. In the embodiment, the network address translation function may be applied to the address space data of the data packet with respect to a destination network address and port identifier of a receiving host. The network address translation function may relate the routable address and port identifier of the group of containers to each network address and port identifier of each of the backend containers, to which the network traffic may be routed from the group of containers, accordingly. For example, the group of containers may route network traffic to one or more corresponding groups of containers, such as a group of backend containers, in accordance with entries of the destination translation table, which may include an entry for each container in the group. A group of containers may be created, for example, based on user input by an end-user or automatically.

In an embodiment of the present invention, an entry in the source translation table may include, for example, a network address translation function such as a source network address translation function, for application in translating, mapping, or transforming the address space data of the data packet, such as received as part of the network traffic received by the backend network by way of the private network. In the embodiment, the network address translation function may be applied to the address space data of the data packet with respect to a source network address and port identifier of a sending host. The network address translation function may relate a source address and port identifier of a backend container to a routable address and port identifier defined in the address space data of the routed data packet, accordingly.

In an embodiment of the present invention, a connection table may be generated based on the destination translation table, with respect to network traffic received and routed by the data hosting computer network system. In the embodiment, the connection table may be generated for application with respect to each data packet of the received network traffic. In the embodiment, the connection table may include, for example, an entry corresponding to a group of containers with respect to a routing path of the data packet in the data hosting system. In the embodiment, the routing path may be defined according to, for example, the address space data and translated address space data of the data packet, with respect to the initial and translated routable addresses and port identifiers of a receiving host such as the group of containers, and the initial and translated source addresses and port identifiers of a sending host such as a backend container. In the embodiment, the entry in the connection table may be applied in translating, mapping, or transforming address space data of subsequently received data packets, such as those having similar routing paths with respect to that of the initially routed data packet in the data hosting system. In the embodiment, the entry in the connection table may be utilized and applied by a node element in lieu of a corresponding entry in a destination translation table, for routing of subsequently received data packets having similar routing paths, with respect to that of the data packet.

For example, a particular node element may utilize a particular connection table by querying the table with respect to address space data of a particular data packet, to identify an entry in the connection table corresponding to the data packet based on the address space data of the data packet. In the example, the query may be performed based on a destination network address and port identifier of a receiving host, and a source network address and port identifier of a sending host, as defined in the address space data of the data packet. In the example, where the entry in the connection table is identified, such as on the basis of a routing path of a previously routed data packet, the identified entry may be applied to the address space data of the particular data packet in routing the data packet, accordingly. In an embodiment of the present invention, an entry in the connection table may be applied by a node element to route the data packet in the data hosting computer network system. In the embodiment, the entry in the connection table may include data that may be applied to, for example, modify the address space data of the data packet with respect to a destination network address and port identifier of a receiving host in the data hosting system, such that the destination network address and port identifier matches that as specified in a corresponding connection table entry.

In an embodiment of the present invention, an entry in a connection table may include, for example, data relating to an initial address space and a translated address space of a particularly routed data packet. In the embodiment, the data relating to the initial address space of the particularly routed data packet may be used in querying the connection table, such as with respect to a subsequently received data packet having a routing path similar to that of the particularly routed data packet, to identify an entry in the connection table for use in routing the subsequently received data packet, accordingly. In the embodiment, translated address space data of the particularly routed data packet may include, for example, a translated destination network address and port identifier, and an original or untranslated source network address and port identifier. Where a query fails to identify the corresponding connection table entry, a destination translation table may be used, such as in a manner known in the art. In the embodiment, the query may be performed, for example, with respect to initial address space data of the data packet. In the embodiment, where the query fails to identify the corresponding connection table entry, an entry identified in the destination translation table may be used instead for routing, and further, a corresponding entry in the connection table may be created based on the identified entry in the destination translation table, for subsequent use in routing subsequently received data packets based on the corresponding entry in the connection table, accordingly.

At step S206, address space data of the data packet received by the frontend network and subsequently received by the group of containers, is translated for routing, accordingly. In an embodiment of the present invention, the address space data of the data packet may be translated by a node element such as of an allocated and provisioned cluster, by which the container may be hosted, accordingly. In the embodiment, the node element may translate the address space data of the data packet by implementing the destination translation table with respect to the group of containers, accordingly. In the embodiment, the address space data may be translated with respect to, for example, the destination or routable address and port identifier of an intended destination of the data packet, such as with respect to a receiving host, or the like. In the embodiment, the routable address and port identifier of the address space data may be translated to correspond to a network address and port identifier of a backend container, such as of the data hosting computer network system, for routing by the container to the backend container, accordingly.

In an embodiment of the present invention, an entry in the connection table may be generated by the node element with respect to a routing path of the data packet, for example, where the routing path of the data packet is determined to be unique.

In an embodiment of the present invention, after processing of the data packet by the backend container, a response data packet, such as with respect to a request for an electronic resource or service of the data packet routed by the container to the backend container, may be received by the group of containers, accordingly. In the embodiment, address space data of the response data packet may include, for example, a destination or routable address and port identifier of a receiving host corresponding to that of a client such as application 111, and a source addresses and port identifier of a sending host corresponding to that of the backend container, accordingly. In the embodiment, the address space data of the response data packet may be translated by the node element by which the container may be hosted, accordingly. In the embodiment, the node element may translate the address space data of the data packet by implementing the source translation table with respect to the group of containers, accordingly. In the embodiment, the address space data may be translated with respect to, for example, the source address and port identifier of a sending host of the data packet. In the embodiment, the source address and port identifier of the address space data of the response data packet may be translated to correspond to, for example, the routable address and port identifier of the group of containers, accordingly.

At step S208, the data packet is routed. In an embodiment of the present invention, the data packet may be routed by application of the destination translation table, the source translation table, and the connection table, accordingly. In the embodiment, the tables may be respectively installed or otherwise stored on each node element of the allocated and provisioned cluster by routing module 136, for application with respect to data packets routed by the containers of the group of containers hosted by the cluster of node elements, accordingly.

In an embodiment of the present invention, the generated network address translation rules stored on each node element may be implemented with respect to the address space data of the data packet in connection with a source network address and port identifier of a sending host, and a destination network address and port identifier of a receiving host. In the embodiment, the sending host may include, for example, a client such as application 111. In the embodiment, the receiving host may include, for example, a container such as may be hosted by the node element, accordingly. The generated network address translation rules may be implemented by each of the node elements, accordingly.

Figure 3:
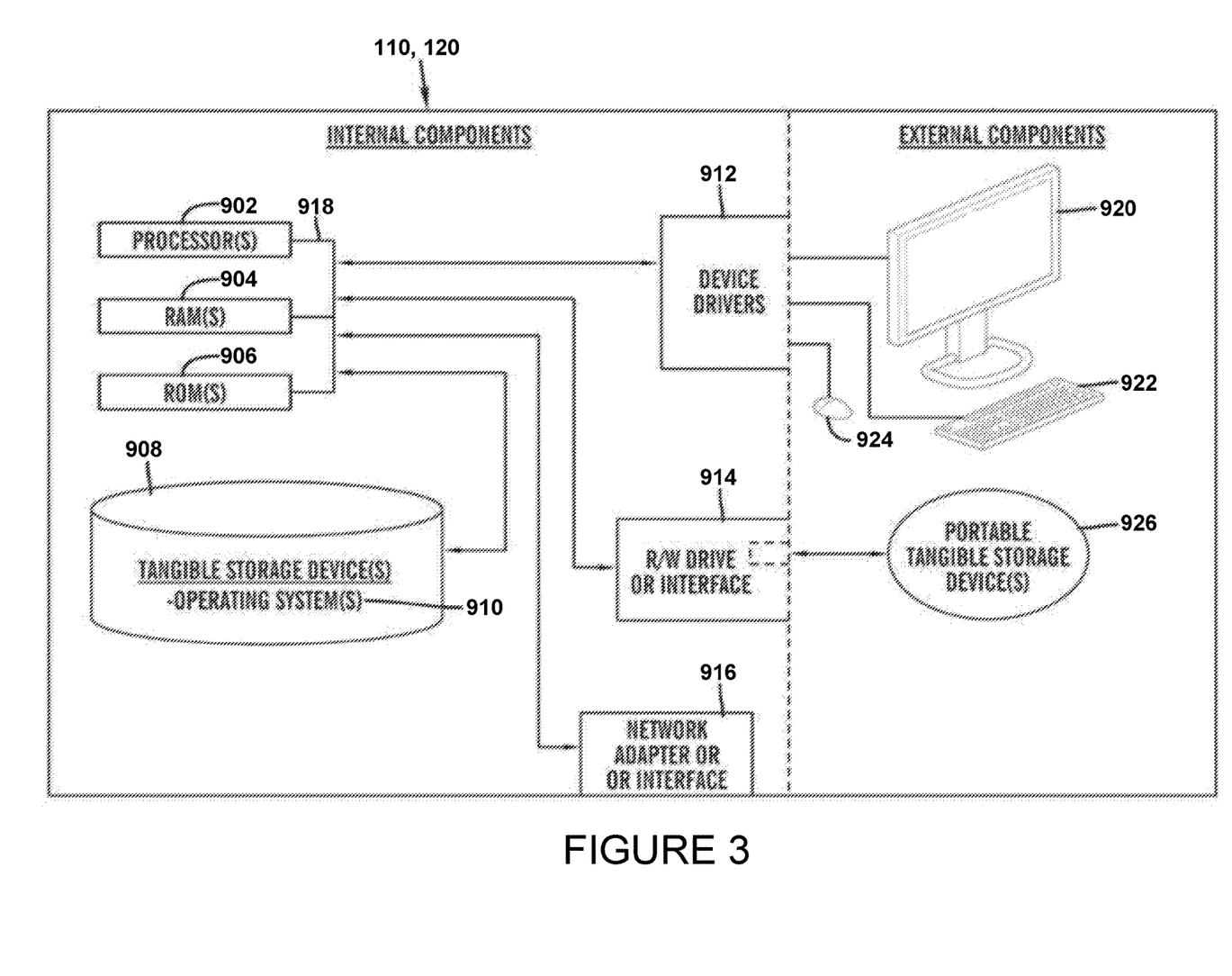
FIG. 3 is a block diagram depicting a user device and/or a container cluster management device 120, in accordance with an embodiment of the present invention.

FIG. 3 is a block diagram depicting user device 110 and/or container cluster management device 120, in accordance with an embodiment of the present invention.

As depicted in FIG. 3, user device 110 and/or container cluster management device 120 may include one or more processors 902, one or more computer-readable RAMs 904, one or more computer-readable ROMs 906, one or more computer readable storage media (tangible storage device) 908, device drivers 912, read/write drive or interface 914, network adapter or interface 916, all interconnected over a communications fabric 918. The network adapter 916 communicates with a network (not shown). Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs (not shown), such as load balancing program 130 residing on container cluster management device 120 are stored on one or more of the computer readable storage media 908 for execution by one or more of the processors 902 via one or more of the respective RAMs 904 (which typically include cache memory). In the illustrated embodiment, each of the computer readable storage media (tangible storage device) 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User device 110 and/or container cluster management device 120 may also include a R/W drive or interface 914 to read from and write to one or more portable computer readable storage media 926. Application programs on user device 110 and/or container cluster management device 120 may be stored on one or more of the portable computer readable storage media (portable tangible storage device) 926, read via the respective R/W drive or interface 914 and loaded into the respective computer readable storage media 908. User device 110 and/or container cluster management device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs on a server may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. User device 110 and/or container cluster management device 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Container cluster management device 120 can be a stand-alone network server, or represent functionality integrated into one or more network systems. In general, user device 110 and/or container cluster management device 120 can be a laptop computer, desktop computer, specialized computer server, or any other computer system known in the art. In certain embodiments, container cluster management device 120 represents computer systems utilizing clustered computers and components to act as a single pool of seamless resources when accessed through a network, such as a LAN, WAN, or a combination of the two. This implementation may be preferred for data centers and for cloud computing applications. In general, user device 110 and/or container cluster management device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
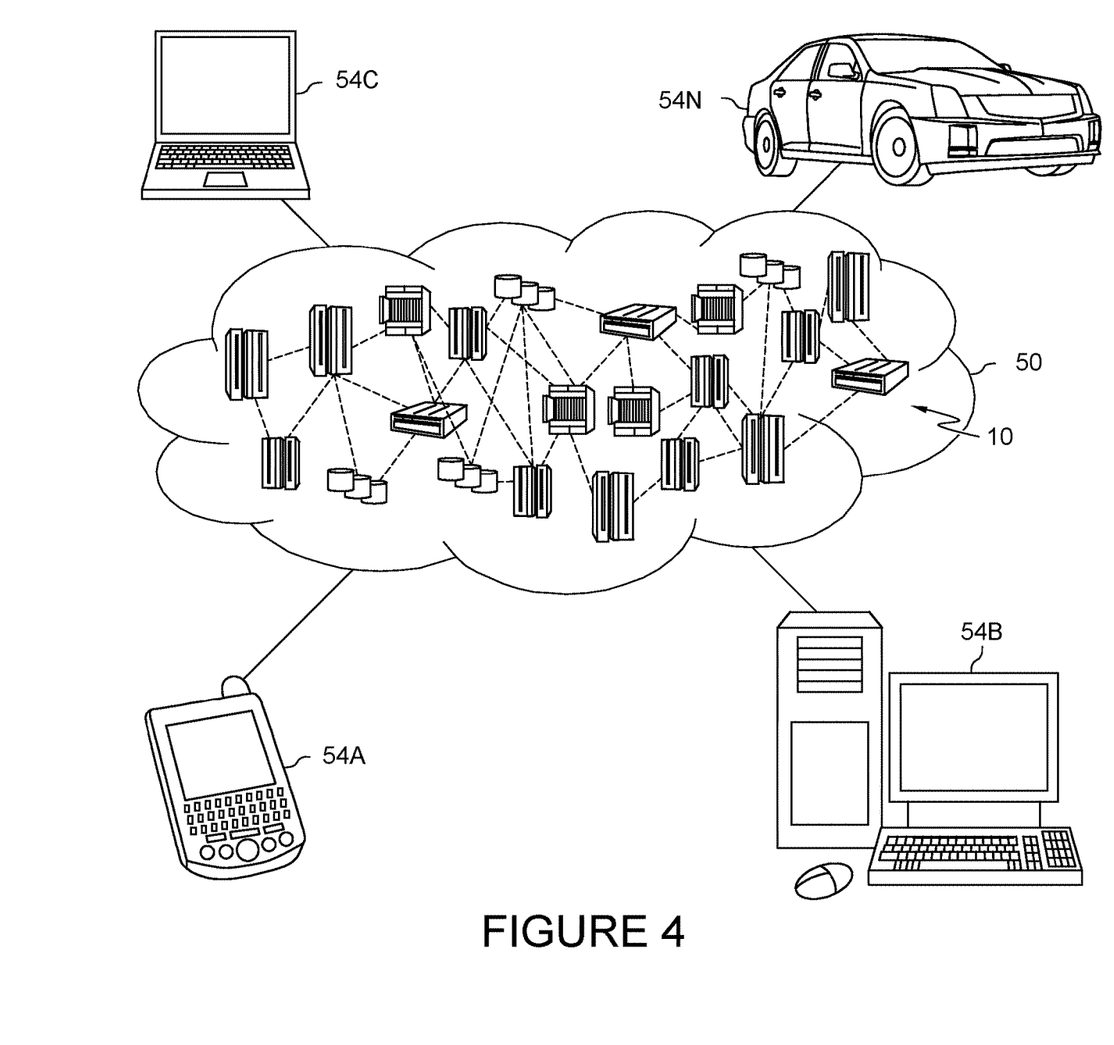
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
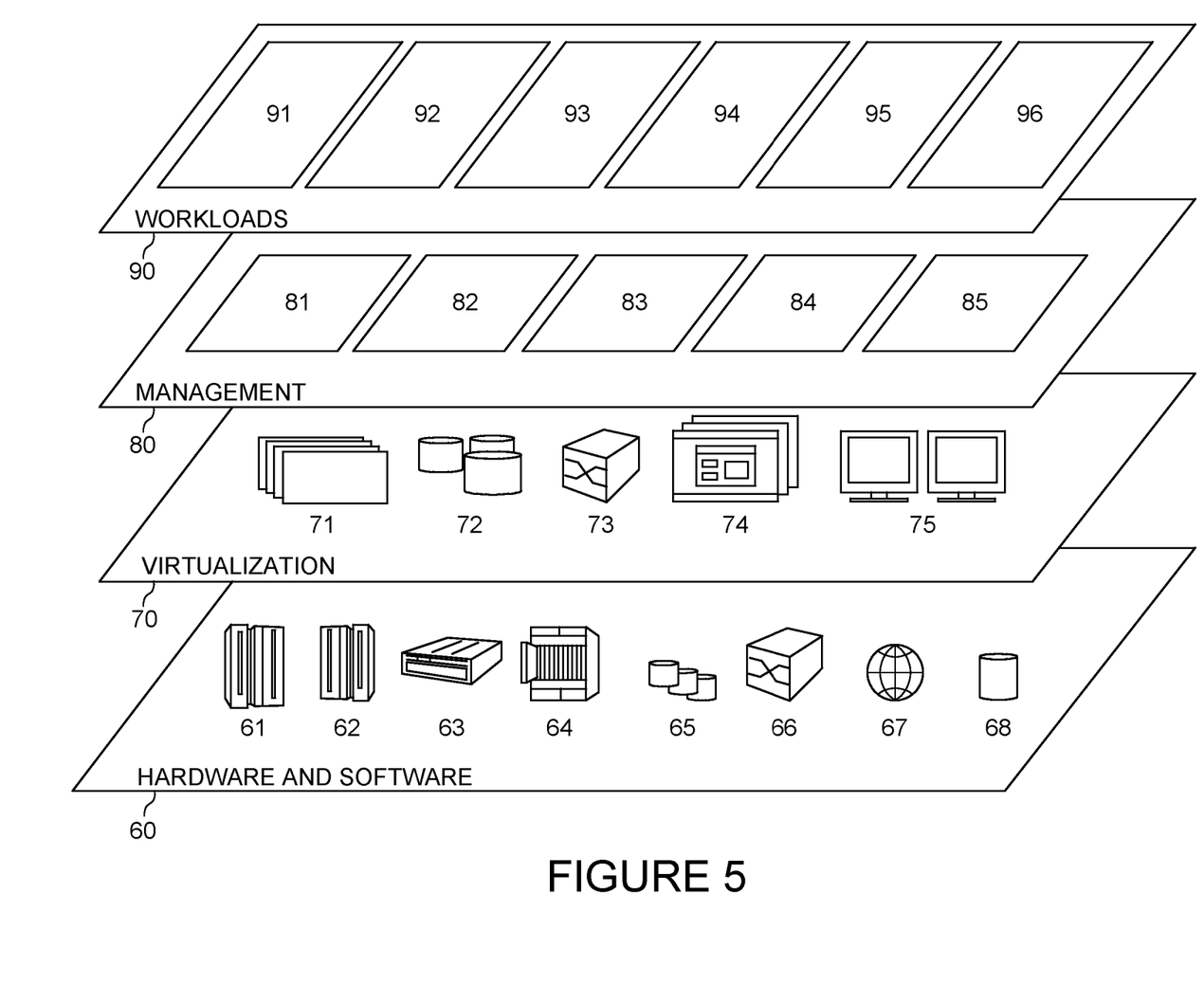
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96. Load balancing 96 may include functionality enabling the cloud computing environment to be used in routing network traffic, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method in a data hosting network having a plurality of node elements, the method comprising:

receiving, by a node element, a first data packet from a client, the first data packet including initial address space data comprising an initial destination network address and port identifier of the first data packet;

executing, by the first node element, first network address translation rules with respect to the first data packet, the first network address translation rules being executed to generate translated address space data of the first data packet by translating the initial destination network address and port identifier of the first data packet for routing of the first data packet to a host of the data hosting network;

generating, by a container cluster management device, an entry in a network address translation table based on the initial address space data and the translated address space data of the first data packet, the generated entry comprising data related to the translated destination network address and port identifier of the first data packet, and an initial source network address and port identifier of the first data packet;

receiving, by the node element, a second data packet from the client, the second data packet including initial address space data comprising an initial destination network address and port identifier of the second data packet;

identifying, by the node element, the generated entry in the network address translation table based on correspondence between the initial address space data of the first data packet and initial address space data of the second data packet;

executing, by the node element, second network address translation rules with respect to the second data packet according to the identified entry to translate the initial address space data of the second data packet, the second network address translation rules being executed based on the translated destination network address and port identifier of the first data packet to translate data related to the initial destination network address and port identifier of the second data packet; and routing, by the node element, the second data packet with respect to the initial and translated address space data of the second data packet, wherein a response data packet is routed directly to the client upon servicing of the second data packet based on data related to an initial source network address and port identifier of the second data packet.

2. The computer-implemented method of claim 1, wherein the host comprises a container that is hosted by one or more node elements of the data hosting network.

3. The computer-implemented method of claim 2, wherein generating an entry comprises:

installing the network address translation table on a node element.

4. The computer-implemented method of claim 1, further comprising:

monitoring a hosted group of containers with respect to each container added to and removed from the hosted group of containers;

updating the network address translation table based on each container added to the hosted group of containers, by adding a corresponding entry in the network address translation table; and updating the network address translation table based on each container removed from the hosted group of containers, by removing a corresponding entry in the network address translation table.

5. The computer-implemented method of claim 4, wherein the hosted group of containers and each container of the hosted group of containers are created based on user input by an end-user.

6. The computer-implemented method of claim 1, wherein the host comprises a container, the container belonging to a group of containers hosted by a cluster of node elements, the group of containers being assigned an internet protocol (IP) address.

* * * * *